May 8, 1923.

J. L. PATTERSON ET AL 1,454,765

MEASURING DEVICE

Filed May 26, 1922

Inventors
John L. Patterson,
Luther R. Bivins,

By Dodge and Sons,

Attorneys

Patented May 8, 1923.

1,454,765

UNITED STATES PATENT OFFICE.

JOHN L. PATTERSON, OF WESTHAMPTON, AND LUTHER R. BIVINS, OF HIGHLAND SPRINGS, VIRGINIA.

MEASURING DEVICE.

Application filed May 26, 1922. Serial No. 563,835.

*To all whom it may concern:*

Be it known that we, JOHN L. PATTERSON and LUTHER R. BIVINS, citizens of the United States, residing, respectively, at Westhampton and at Highland Springs, in the county of Henrico and State of Virginia, have invented certain new and useful Improvements in Measuring Devices, of which the following is a specification.

This invention relates to measuring devices, and particularly to devices for measuring carbonated liquids.

In measuring carbonated liquids, considerable difficulty has been encountered due to the necessity of retaining the gas pressure until the measured quantity of liquid is discharged. The construction heretofore commonly used has included a cylinder and a displacement piston which is moved alternately from one end to the other of a measuring cylinder. The piston was displaced by admitting the carbonated liquid against alternate sides thereof through a multiple-way valve. In devices of this sort, the piston merely moved to the end of its travel in the cylinder and then came to rest, thus terminating the outflow. In the simplest type of device of this class, reliance is placed on the piston packing to prevent leakage between successive measuring actuations, but, as this has been found unsatisfactory, recourse has been had to packings mounted in the ends of the cylinder and engaged by the piston at the opposite limits of its travel. This arrangement is unsatisfactory because the packing is likely to affect the flavor of the carbonated liquid, and because it is difficult to keep the packing tight for long periods.

The present invention provides a device which operates through the displacement of a piston in a cylinder, but in which the multiple-way valve serves as a stop valve between each measuring operation. Consequently the piston packing need not be very tight and it becomes possible to avoid the difficulties formerly encountered.

In the drawings:—

Figure 1:
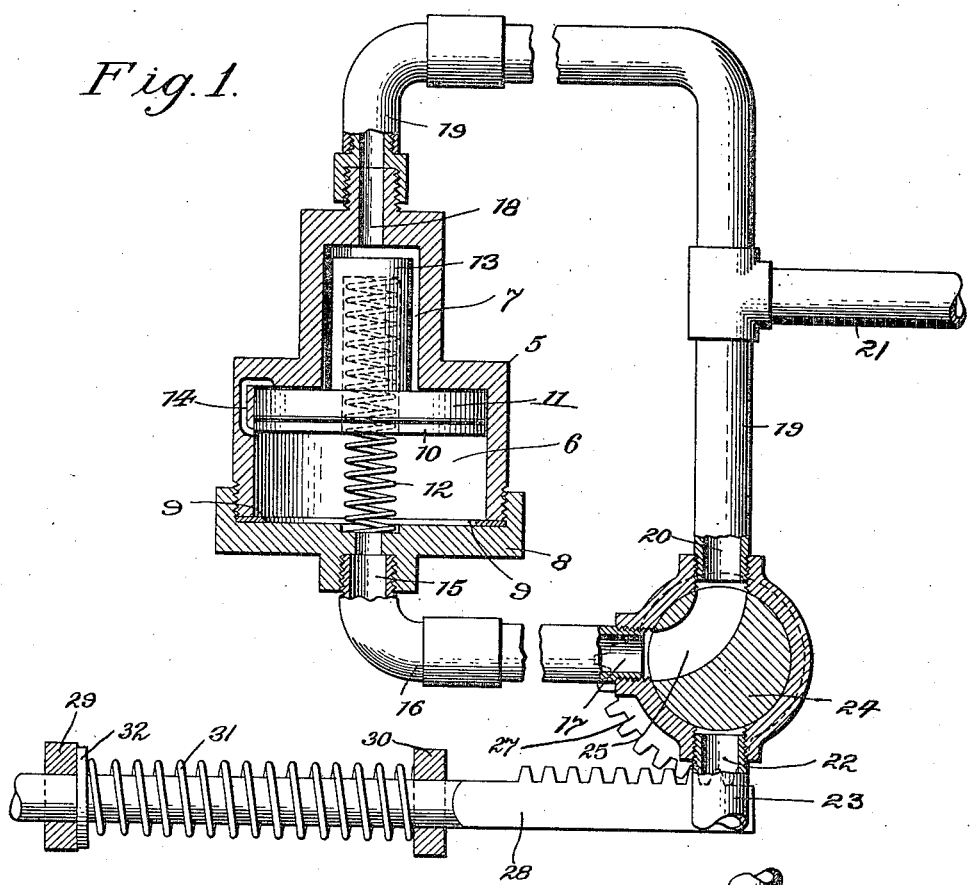
Fig. 1 is longitudinal axial section through the measuring chamber and a transverse section through the two-way valve, showing the valve and the measuring piston in their normal positions.
Figure 2:
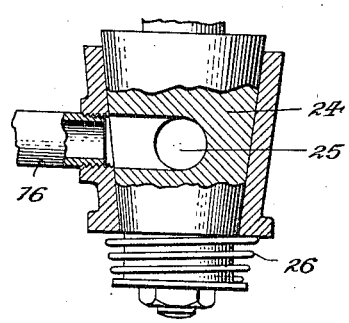
Fig. 2 is a plan view of the valve, broken away to show in part a section on the line 2—2 of Fig. 3.

The measuring cylinder consists of a shell 5 having a large cylindrical chamber 6 and a smaller cylindrical chamber 7 in free communication with each other. The shell 5 is closed at its larger end by a cap 8 which is threaded thereon and which seats against a gasket 9. The shell 5 is mounted in a vertical position as shown and encloses a piston 10 which is sealed by a cup leather 11. The piston is urged to its uppermost position by a spring 12 which is partly housed in a recess formed in an extension 13 of the piston 10. This recess permits the use of a longer spring so that the spring stress does not rise unduly as the piston moves downward.

In the normal position, shown in Fig. 1, a small port 14 connects the space on the opposite sides of piston 10. This port is quite small but is somewhat exaggerated in size in the drawing to render it clearly visible.

Figure 3:
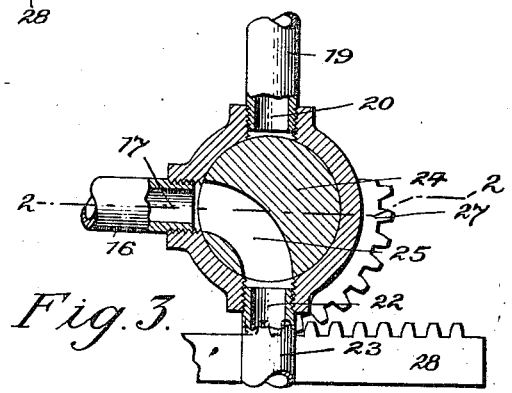
Fig. 3 is a transverse section of the valve, showing it in discharge position.

The port 15, formed in the head 8, is connected by a pipe 16 with a combined discharge and equalizing port 17 in the valve casing. A port 18, in the upper end of the casing 5, is connected by means of a pipe 19 with the equalizing port 20 in the valve casing. A supply pipe 21 is connected with the pipe 19 and through this carbonated liquid under pressure is led to the device. A discharge port 22, also formed in the valve casing, is connected by a pipe 23 to the discharge. A rotary plug 24 turns in the valve casing and is formed with a combined equalizing and discharge port 25 which in one position connects ports 17 and 20 and in another position connects ports 17 and 22 (see Fig. 3). The coil spring 26 holds the conical plug 24 to its seat in the valve casing.

The valve is actuated by a mechanism including a toothed sector 27 fast to the valve plug 24 and a rack 28 meshing therewith. The rack 28 forms part of the slide rod which is longitudinally movable in the guides 29 and 30, and which normally is urged to the left by means of a spring 31 which surrounds the slide rod and is confined between a collar 32 and the right-hand guide 30. The normal position of the parts is, therefore, that shown in Fig. 1, this being the position of the parts which the spring 31 tends to maintain.

In this normal position shown in Fig. 1, the ports 17 and 20 are connected with each other by means of the port 25 and the piston 10, if in a lower position, will rise to the upper end of the casing 5 under the action of the spring 12. Such movement results in displacing the liquid from the space above the piston 10 and simultaneously filling the space beneath the piston 10. It is important to observe that, in the normal position of the valve plug 24, the discharge port 22 is closed.

To deliver a measured charge of carbonated liquid, the slide is moved to the right against the action of the spring 31. This rotates the plug 24 counter clockwise to the position shown in Fig. 3. In this position, the port 25 connects the port 17 with the port 22. Carbonated liquid entering from the supply pipe 21 forces the piston 10 downward to the limit of its motion and, as the piston moves downward, the carbonated liquid below it is discharged.

When flow ceases, the slide is permitted to move to the left under the action of the spring 31. The resulting movement of the valve closes the discharge port and reestablishes the equalizing connection between ports 17 and 20 by means of port 25. The piston 10 then rises once more to the upper limit of its motion. Since the valve plug 20 cuts off all discharge between measuring actuations, the piston packing 11 is never subjected to long sustained fluid pressure. This fact, and the further fact that the piston is subject to substantial pressure only in one direction, simplifies the construction of the packing by making possible the use of a cup leather which is urged to tight sealing relation by the pressure itself.

The by-pass 14 is open only in the normal position of the piston at a time when valve 24 is closing the discharge. The function of the by-pass is to permit any gas which may separate from the carbonated liquor to pass around the piston. This prevents the accumulation of any substantial quantity of gas beneath the piston. The port is blanked as soon as the piston has moved slightly downward, and this fact and the small size of the port insure that the presence of the port will not affect the accuracy of the measurement.

The structure above described is susceptible of modification without departure from the inventive principle, and we do not imply any necessary limitation to the exact structure illustrated except as specified in the appended claims. The embodiment shown has been found to have practical advantages arising from its simplicity and the rugged construction of the parts.

What is claimed is:—

1. In a measuring device, the combination of a measuring cylinder; a piston movable therein; means urging said piston to one limit of its motion in said cylinder; a supply connection serving to convey fluid under pressure to the measuring cylinder; a discharge connection serving to convey fluid from the measuring device to the point of use; connections to the opposite ends of said cylinder; and a valve operatively associated with said connections and serving in one position to close said discharge connection and connect the opposite ends of said cylinder, and in another position to connect the discharge connection with one end of said cylinder while interrupting the connection between the opposite ends of said cylinder.

2. In a measuring device, the combination of a measuring cylinder; a piston movable therein; means serving to urge said piston toward one end of said cylinder; a supply connection connected with the above named end of the cylinder; and a valve having a discharge port and ports connected with the opposite ends of said cylinder, said valve serving in one position to close said discharge port and connect the opposite ends of the cylinder with each other, and in another position to disconnect the ends of the cylinder from each other and connect the discharge port to the end of the cylinder remote from said supply connection.

3. In a measuring device, the combination of a measuring cylinder; a piston movable therein; means urging said piston to one limit of its motion in said cylinder; a supply connection serving to convey fluid under pressure to the measuring cylinder; a discharge connection serving to convey fluid from the measuring device to the point of use; connections to the opposite ends of said cylinder; a valve operatively associated with said connections and serving in one position to close said discharge connection and connect the opposite ends of said cylinder, and in another position to connect the discharge connection with one end of said cylinder while interrupting the connection between the opposite ends of said cylinder; and a restricted by-pass controlled by said piston and serving to establish communication between opposite sides of the piston in one limiting position thereof.

4. In a measuring device, the combination of a measuring cylinder; a piston movable therein; means serving to urge said piston toward one end of said cylinder; a supply connection connected with the above named end of the cylinder; a valve having a discharge port and ports connected with the opposite ends of said cylinder, said valve serving in one position to close said discharge port and connect the opposite ends of the cylinder with each other, and in another position to disconnect the ends of the cylinder from each other and connect the discharge port to the end of the cylinder remote from said supply connection; and a restricted by-pass controlled by said piston and establishing communication between opposite sides of the piston when the latter is held at the limit of its motion by said piston-urging means.

In testimony whereof we have signed our names to this specification.

JOHN L. PATTERSON.
LUTHER R. BIVINS.